United States Patent [19]

Yoshida

[11] Patent Number: 4,982,823

[45] Date of Patent: Jan. 8, 1991

[54] BIDIRECTIONAL CLUTCH FOR CURTAIN DRAWING MECHANISM

[75] Inventor: Yutaka Yoshida, Saitama, Japan

[73] Assignee: Kabushiki Kaisha Yokota, Tokyo, Japan

[21] Appl. No.: 359,716

[22] Filed: May 31, 1989

[51] Int. Cl.$^5$ ............................................. F16D 41/07
[52] U.S. Cl. ......................................... 192/38; 192/31
[58] Field of Search ................... 192/31, 38, 45, 8 R, 192/50

[56] References Cited

U.S. PATENT DOCUMENTS

| | | | |
|---|---|---|---|
| 836,035 | 11/1906 | Hendricks | 192/50 |
| 1,015,861 | 4/1909 | Warner | 192/8 R |
| 1,141,319 | 6/1915 | Coykendall | 192/50 |
| 2,066,167 | 12/1936 | Swartz | 192/8 R |
| 2,286,760 | 6/1942 | Peterson | 192/38 |
| 2,389,886 | 11/1945 | Bardega | 192/8 R |
| 3,243,023 | 3/1966 | Boyden | 192/8 R |
| 4,253,554 | 3/1981 | Nisenson | 192/38 |

Primary Examiner—Rodney H. Bonck
Assistant Examiner—Nicholas Whitelaw
Attorney, Agent, or Firm—Wenderoth, Lind & Ponack

[57] ABSTRACT

A bidirectional clutch for a pulley drive has a rotary cam adapted to be mounted on an upright drive shaft of a motor, a pulley body having a drum portion coaxial with and spaced from the rotary cam, a plurality of rotary bodies positioned in the space between the drum portion and the rotary cam, and a guide member for rotatably supporting the rotary bodies for movement toward and away from the drum portion, a face of the rotary cam being opposed to the drum portion having a cam portion which, upon the cam being rotated relative to the rotary bodies and the drum portion through an angle equal to or greater than a predetermined angle, moves the rotary bodies toward and pressed them into engagement with the drum portion to transmit the rotational force of the motor to the drum portion and the pulley body.

4 Claims, 7 Drawing Sheets

BIDIRECTIONAL CLUTCH FOR CURTAIN DRAWING MECHANISM

BACKGROUND OF THE INVENTION

1. Field of the Invention

The present invention relates to a bidirectional clutch for a curtain drawing mechanism which uses a motor.

2. Statement of the Prior Art

Heretofore, curtains have been automatically drawn or opened or pulled up or down by forward or backward movement of a drawing string in engagement with the curtains and driven by a motor through a drive pulley.

In such a device, if automatic driving of the drawing string becomes impossible due to a motor failure or the like, it is then required to manually move the string. However, if a pulley is directly fixed to the drive shaft of the motor, it is impossible to move the string by a moderate force due to the resistance of the motor. For that reason, it is necessary to interpose a clutch mechanism between the pulley around which the drawing string is wound and the motor for rotating the pulley. An electromagnetic clutch has generally been used for this purpose.

A problem with the use of such an electromagnetic clutch is, however, that it is necessary to use an electrical control mechanism for operating it, which makes the associated control structure and system complicated as well as expensive to manufacture.

SUMMARY OF THE INVENTION

In view of such a problem with the prior art system, an object of the present invention is to provide a bidirectional clutch for a curtain drawing mechanism which is relatively inexpensive to manufacture, assures that the forward or backward rotational force of a motor is transmitted to a drive pulley when the motor is actuated, and ensures clutch disconnection when the motor is not actuated.

According to the present invention, this object is achieved by the provision of a bidirectional clutch for a curtain drawing mechanism, which includes a rotary cam connected to an upright rotating drive shaft of a motor, a pulley body having a pulley groove in and around which a curtain drawing string is to be wound, and having a drum portion suitably spaced from said rotary cam, a plurality of rotary bodies interposed in said space and a guide wheel for movably and rotatably supporting said rotary bodies and causing them to move out of contact with said drum portions, and in which the face of said rotary cam opposite the face of said drum portion is provided with a cam portion which moves said rotary bodies toward the drum portion by a relative turning equal to or larger than a predetermined angle of turning of said cam portion for pressing the rotary bodies into engagement with said drum portion to transmit the rotational force of said motor to said pulley body.

The rotary bodies can be moved radially in such a way that they are moved by the rotary cam into pressing engagement with the drum portion to transmit the rotational force of the motor to the pulley body.

The rotary cam can be provided on its outer periphery with a cam surface having a number of angled portions equal to the number of rotary bodies and located inside the drum portion.

Still further, the rotary cam can be provided on its inner periphery with a cam surface having a number of projections equal to the number of rotary bodies and located outside the drum portion.

When the motor is actuated, the rotary cam connected to the rotating shaft thereof starts to rotate, while the rotary bodies and the guide wheel remain stopped due to inertia, so that the rotary bodies supported by the guide wheel are pressed by the cam surfaces of the rotary cam, and are moved toward and into engagement with the drum portion of the pulley body, whereby the rotary bodies are wedged in between the rotary cam and the drum portion to transmit the rotational force of the motor therethrough to the pulley body. During the subsequent normal running of the motor, the rotary bodies remain in the wedged state, so that the rotational force of the motor is continuously transmitted to the pulley body.

The foregoing operation is the same for both the forward and reverse operation of the motor.

When the motor is stopped, on the other hand, the rotary cam is correspondingly stopped, but the pulley body, guide wheel and rotary bodies continue rotating due to inertia, so that the rotary bodies are freed from the rotary cam and the pulley body. It will be appreciated that in order to insure the release of the wedging effect of the rotary bodies and the drum portion, it is preferred to reverse the motor for a moment, thereby insuring that the engaging force in the engaged state of the clutch is released.

When the curtain is manually drawn or opened when the rotary bodies are not engaged with the drum portion, the rotational force is input from the drawing string to the pulley body and the drum portion. However, since the drum portion is disengaged from the rotary bodies and the guide wheel remains stopped due to inertia, only the pulley body and drum are rotated. Such rotational force is not transmitted to the rotary bodies, guide wheel and the cam, so that the motor is not rotated. Thus, since the resistance of the motor does not need to be overcome during the manual drawing or opening of the curtain, the curtain can be easily moved by manual operation.

For the reasons described above, the rotary cam may be disposed either inside or outside the drum portion. In either case, the rotational force is transmitted to the rotary drum through the rotary bodies by the rotation of the rotary cam.

EXPLANATION OF THE PREFERRED EMBODIMENTS

Figure 1:
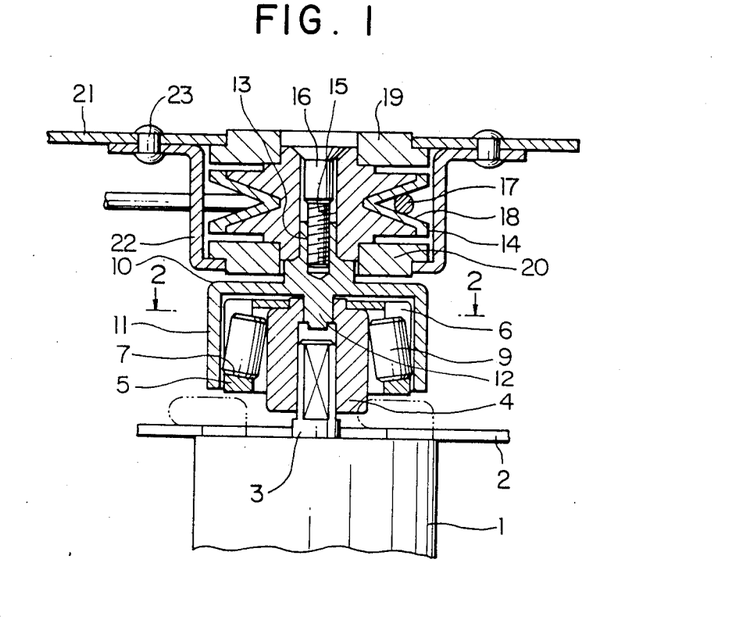
FIG. 1 a sectional view of the first embodiment of the bidirectional clutch of the present invention.

Referring now to FIGS. 1–7b, a motor having a reduction gear is shown at 1 in FIG. 1, and is fixed to a mounting plate 2. A drive shaft 3 of the motor 1 has the outer end portion with a tetragonal shape cross-section. A rotary cam 4 is mounted on the drive shaft 3 by fitting a complementary-shaped hole 4c onto the thus shaped shaft end portion.

Figure 5A:
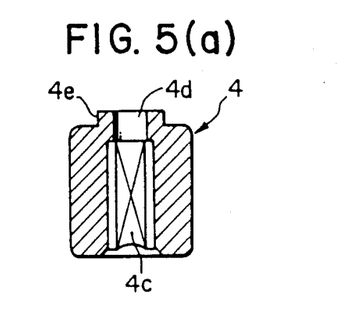
FIGS. 5a and 5b show the rotary cam according to the first embodiment, FIG. 5a being a sectional view and FIG. 5b a plan view.
Figure 5B:
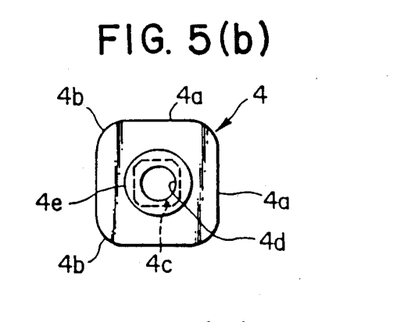

As illustrated in FIGS. 5a and 5b, the rotary cam 4 is substantially in the form of a column having a cross-section of a regular tetragon comprising four flat planes 4a located at 90° to each other and four angled corner portions 4b, each smoothly contiguous to the adjacent flat planes 4a. An axial portion of the rotary cam 4 has therein the angled hole 4c, as already described and a through-hole 4d which is contiguous thereto and which extends through a small diameter circular portion 4e at one axial end of the cam 4.

Figure 6A:
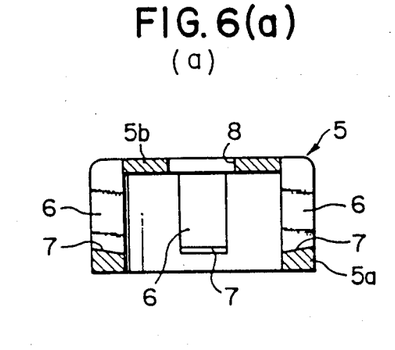
FIGS. 6a and 6b similarly show the guide wheel according to the first embodiment, FIG. 6a being being a sectional view and FIG. 6b a plan view.
Figure 6B:
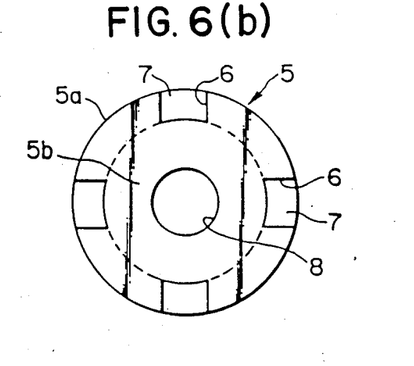

The rotary cam 4 has fitted thereover a guide member in the form of a guide wheel 5. As illustrated in FIGS. 6a and 6b, the guide wheel 5 comprises a cylindrical shaft portion 5a and an end face portion 5b disposed so as to close one end of the portion 5a. The shaft portion 5a is provided at four evenly circumferentially spaced positions with four radial holes 6 extending radially through the thick wall of the shaft portion.

Each of the radial holes 6 is provided on its bottom face with an inwardly inclined support face 7, and holds a rotary body in the form of one roller 9, which is one example of a rotary body, in a rotatable manner. The roller 9 is placed on the inclined support face 7 of the radial hole 6, and the inner face of the upper end is in contact with the rotary cam 4.

Further, the guide wheel 5 is provided at the center of the end face portion 5b with a hole 8 in which the small-diameter portion 4e of the rotary cam 4 is rotatably fitted, whereby the guide wheel 5 is supported by the rotary cam 4 from below, and the relative rotational positions of members 4 and 5 are restricted. Such a guide wheel 5 has a rotary drum 10 fitted thereover, and spaced at a slight interval therefrom.

Figure 7A:
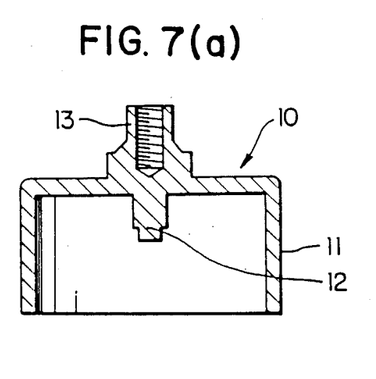
FIGS. 7a and 7b similarly show the rotary drum according to the first embodiment, FIG. 7a being a sectional view and FIG. 7b a plan view.
Figure 7B:
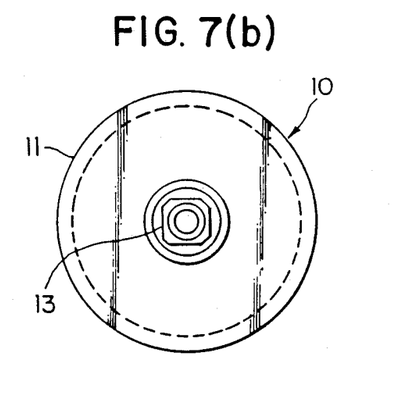

As illustrated in FIGS. 7a and 7b, the rotary drum 10 includes a cylindrical drum portion 11 adapted to cover the outside of the guide wheel 5, and a support shaft 12 extending axially from and integral with the inside of the drum portion 11 and a connecting shaft 13 extending axially from and integral with the outside of the drum portion 11. The support shaft 12 is fitted into the through-hole 4d in said rotary cam 4, so that it is rotatable with respect to the rotary cam 4. The connecting shaft 13 of the rotary drum 10 is inserted through an axial through-hole 15 formed in a pulley body 14, and is fixedly connected to the pulley body 14 by a bolt 16 inserted from the other end of hole 15.

The pulley body 14 has in its outer periphery a V-shaped groove 18 in and around which a drawing string 17 is reeved. The V-shaped groove 18 is located horizontally and the pulley body 14 is supported from both above and below by bearings 19 and 20. The upper bearing 19 is fitted in a hole formed in a support plate 21, and the lower bearing 20 is fitted in a hole formed in a cover plate 22, plates 21 and 22 being riveted together at 23.

It will be understood that the support plate 21 is secured to a curtain rail which is not shown.

Said rotary cam 4 and the rollers 9 and rotary drum 10 which come into contact therewith are in the following relation.

Figure 2:
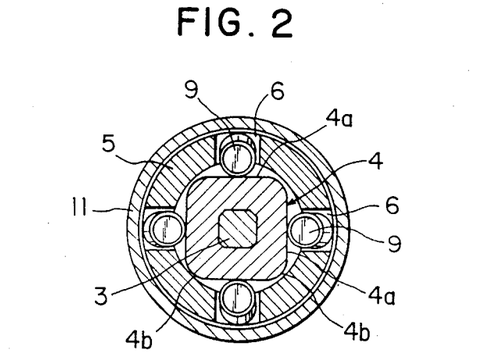
FIG. 2 is a sectional view taken along the line 2—2 of FIG. 1.
Figure 4:
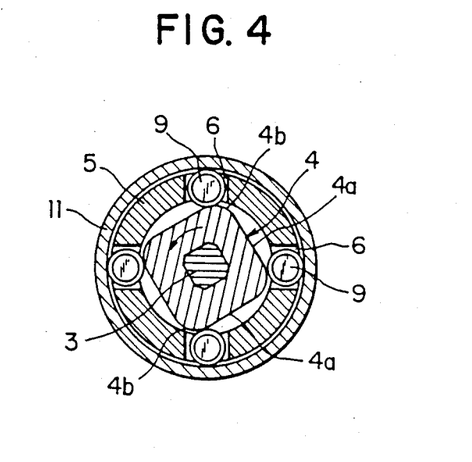
FIG. 4 is a sectional view similar to FIG. 2 for showing the operation of the clutch.

The size and shape of the rotary cam 4 is such that, as illustrated in FIG. 4, the space between the angled corner portions 4b and the inner periphery of the drum portion 11 is slightly smaller than the diameter of the rollers 9 and, as illustrated in FIG. 2, the space between the flat planes 4a and the inner periphery of the drum portion 11 is larger than the diameter of the rollers 9. Therefore, as the rollers 9 are caused to move from engagement with the flat plane 4a to engagement with the angled corner portions 4b, they are pressed into engagement with the inner periphery of the drum portion 11 by a wedging effect, whereby the rotary cam 4, rollers 9 and rotary drum 10 are connected with one another in one integral clutch structure to transmit the rotational force of the motor 1 to the pulley body 14.

The operation of this embodiment will now be explained.

When the motor 1 is actuated starting with the clutch in the disengaged state shown in FIGS. 1 and 2 wherein the rollers 9 are free from engagement with the drum 11, the rotary cam 4 fitted on the drive shaft 3 of the motor 1 and adapted to rotate in unison therewith is rotated correspondingly, while the rollers 9 and the guide wheels 5 remain stopped due to inertia, so that a relative rotational displacement of the rotary cam 4 relative to the rollers 9 and the guide wheel 5 occurs.

Figure 3:
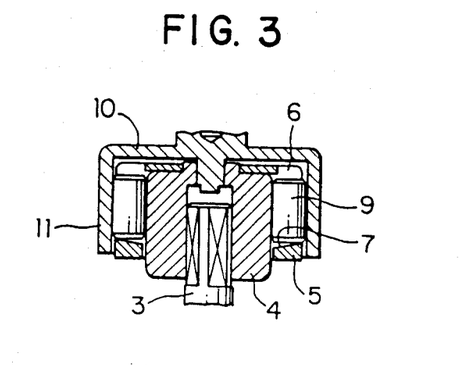
FIG. 3 is a view of part of the clutch of FIG. 1 for illustrating the operation of the clutch.

Thus, as the rotary cam 4 starts to rotate, the flat planes 4a move along rollers 9 to move the angled corner portions 4b toward the rollers 9, so that the angles of inclination of the rollers 9 decrease in response to the relative rotational displacement of the cam 4. The rollers 9, which have contacted the cam faces 4a only at the upper ends in the disengaged state of the clutch, come into contact with the cam face along their full length, as shown in FIGS. 3 and 4. As the rollers 9 are brought into engagement with the inner periphery of the drum portion 11 of the rotary drum 10 under the pressing force of the rotary cam 4, the rollers 9 are wedged between rotary cam 4 and drum portion 11, whereby the rotary cam 4, the rollers 9 and the rotary drum 10 are made integral with one another in the rotational direction, thus transmitting the rotational force of the motor 1 to the pulley body 14, which is in turn rotated in the same direction as the rotating shaft 3.

Normally, during the subsequent running of the motor 1, its rotational force is continuously transmitted to the pulley body 14, because said wedging action is maintained so as to carry out integral rotation of the rotary cam 4, the rollers 9 and the rotary drum 10. As a result, the drawing string 17 is driven by the V-shaped groove 18 in the pulley body 14 in the direction of rotation, whereby the curtain is automatically drawn or opened.

The foregoing operation is the same for the forward or reverse operation of the motor 1.

When the motor 1 is stopped, on the other hand, the rotary cam 4 is stopped correspondingly, but the pulley body 14, the rotary drum 10, the guide wheel 5 and the rollers 9 continue to rotate due to inertia, so that the rollers 9 move from the angled corner portions 4b to the centers of the flat planes 4a. This releases the wedging effect of the rotary cam 4 so that the rollers 9 are set free from the drum 11 to release the connection between rotary cam 4 and pulley body 14.

It will be appreciated that in order to insure the release of wedging of the rollers 9 due to the relative rotation of the rotary cam 4 and the rotary drum 10, it may be preferred to reverse the motor 1 for a moment. That is, by rotating the rotary cam 4 for a moment in the direction opposite to the direction of the action of wedging, the guide wheel 5, the rollers 9 and the drum 10 remain stopped due to inertia, but only the rotary cam 4 is caused to rotate in the opposite direction, so that said wedging action can easily be released.

Therefore, when the motor 1 is stopped and the rollers 9 are free from drum 11, the curtain can be drawn or opened by an external force applied to the drawing string 17 which need be sufficient only for rotating the rotary drum 10 in unison with the pulley body 14. Since the rollers 9, when set free, are tilted on the inclined support faces 7 relative to the rotational axis of the clutch to prevent them from being engaged with the drum 11 to transmit power, only the pulley body 14 and drum 11 are rotated by manual operation of said drawing string 17 and no rotational force is transmitted to the rotary cam 4. Since the motor 1 is therefore not rotated for that reason, the load of the motor 1 does not act as a load resistance to the manual drawing or opening of the curtain, so that the drawing string 17 can be manually operated by a small actuating force.

Therefore, even when the motor cannot be operated due to a power failure or the like, the curtain can be lightly drawn or opened relatively easily by hand because the clutch is disengaged.

A second embodiment of the present invention will now be explained with reference to FIGS. 8–15, wherein balls 30 are used as the rotary bodies.

Figure 8:
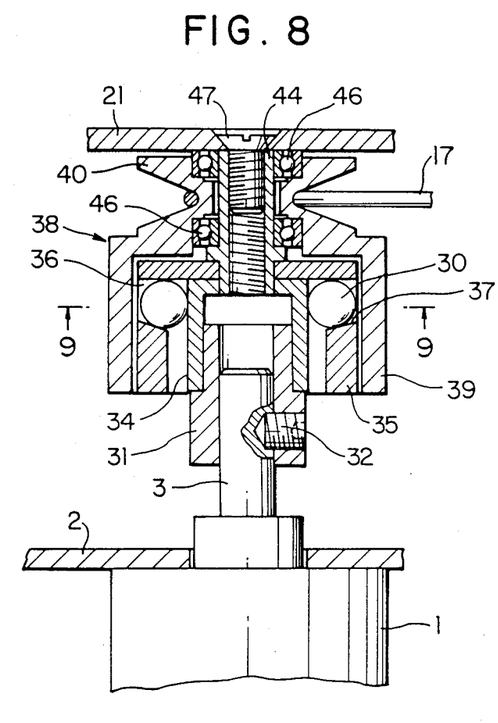
FIG. 8 is a sectional view of the second embodiment of the bidirectional clutch of the present invention.
Figure 9:
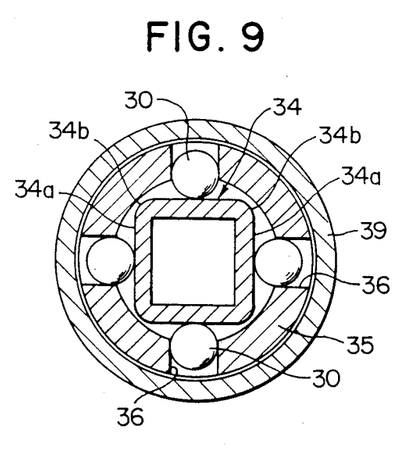
FIG. 9 is a sectional view taken along the line 9—9 of FIG. 8.
Figure 11A:
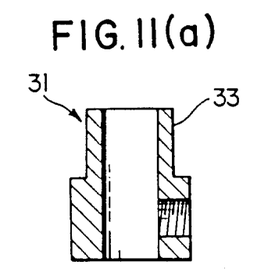
FIGS. 11a and 11b show the sleeve according to the second embodiment, FIG. 11a being a sectional view and FIG. 11b a plan view.
Figure 11B:
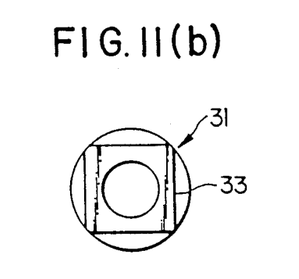
Figure 12A:
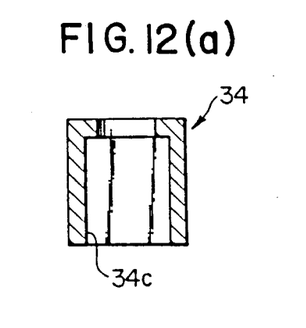
FIGS. 12a and 12b similarly show the rotary cam of the second embodiment, FIG. 12a being a sectional view and FIG. 12b plan view.
Figure 12B:
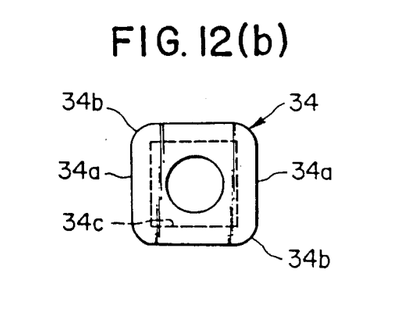

In FIG. 8, reference numeral 31 designates a sleeve fixed to the rotating shaft 3 of the motor 1 by means of a set screw 32. The sleeve 31 comprises a cylindrical shaft which has a polygonal cross-section portion 33, as illustrated in FIGS. 11a and 11b, and a rotary cam 34 is mounted on said portion 33. As illustrated in FIGS. 12a and 12b, the rotary cam 34 is in the form of a tetragonal column having four flat planes 34a diametrically opposite each other and four curved corner portions 34b smoothly contiguous to the adjacent flat planes 34a. Said polygonal cross-section portion 33 is fitted into a tetragonal hole 34c formed inside the rotary cam 34.

Figure 13A:
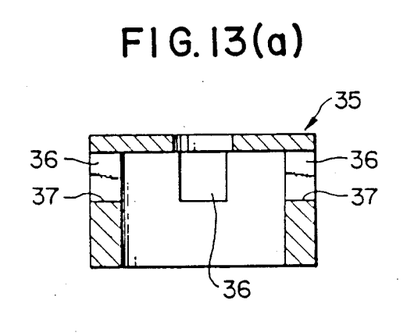
FIGS. 13a and 13b similarly show the guide wheel of the second embodiment, FIG. 13a being a sectional view and FIG. 13b a plan view.
Figure 13B:
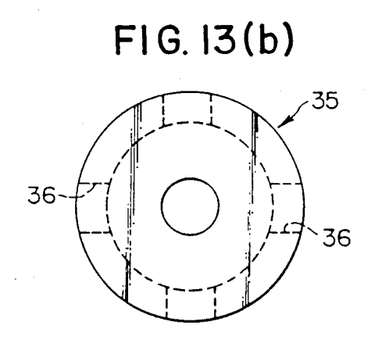

As illustrated in FIGS. 13a and 13b, a guide wheel 35 has four radial holes 36 therein, and as is the case with the first embodiment, the bottom faces of said holes are radially inwardly and downwardly inclined support faces 37.

Figure 14A:
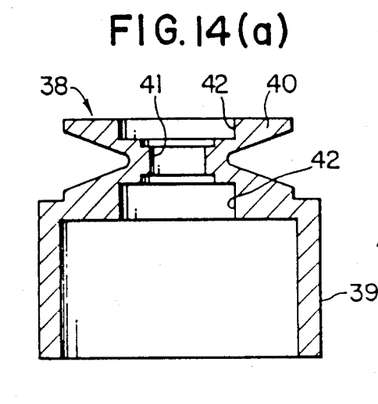
FIG. 14a and 14b similarly show the pulley body of the second embodiment, FIG. 14a being a sectional view and FIG. 14b a plan view.
Figure 14B:
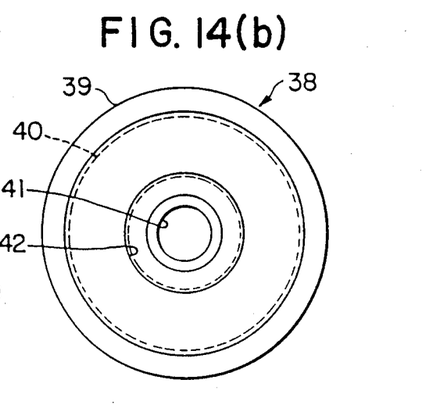

A pulley body 38 is provided which has a drum portion 39 and a pulley portion 40 in one integral piece. Drum portion 39 depends around the outside of and is spaced slightly from guide wheel 35. As illustrated in FIGS. 14a and 14b, a hole 41 for the insertion of a shaft 44 and two bearing holes 42 on both ends of the hole 41 are provided inside the pulley portion 40.

Figure 15A:
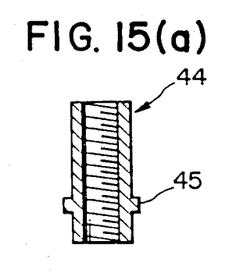
FIGS. 15a and 15b similarly show the shaft of the second embodiment, FIG. 15a being a sectional view and FIG. 15b a plan view.
Figure 15B:
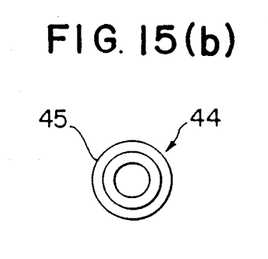

As illustrated in FIGS. 15a and 15b, the shaft 44 is in the form of a column including an outwardly extending flange 45. The outer rings of two bearings 46 fitted over the shaft 44 are fitted into the bearing holes 42, and the pulley body 38 is rotatably supported on the shaft 44 through bearings 46. The shaft 44 is secured to the support plate 21 by a screw 47.

Said rotary cam 34 and the balls 30 and drum portion 39 which engage therewith are in the following relation.

Figure 10:
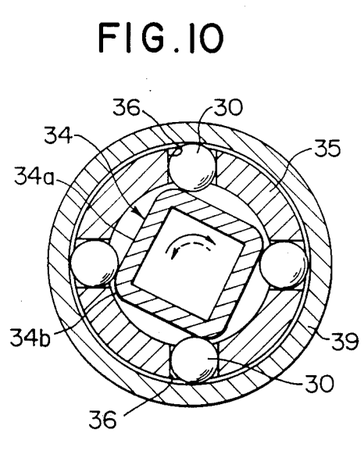
FIG. 10 is a sectional view corresponding to FIG. 9 for illustrating the operation of the clutch.

The dimensions of the rotary cam 34 are such that, as illustrated in FIG. 10, the space between corner portions 34b and the inner periphery of the drum portion 39 is slightly smaller that the diameter of the balls 30 and the space between flat planes 34a and inner periphery of the drum portion 39 is larger than the diameter of the balls 30.

The remainder of the structure is similar to that of the first embodiment. Effects similar to those obtained in the first embodiment are attained with such construction. In other words, as the balls 30 are moved outwardly in the radial holes 36 by relative movement of the cam 34 first by the flat planes 34a and then the corner portions 34b, the balls 30 are pressed into engagement with the inner periphery of the drum portion 39 by the force of the rotary cam 34, and are wedged between the rotary cam 34 and drum portion 39. This causes the rotary cam 34, the balls 30 and the pulley body 38 to be connected together as one integral piece, so that the rotational force of the motor 1 is transmitted to the pulley body 38.

Figure 16:
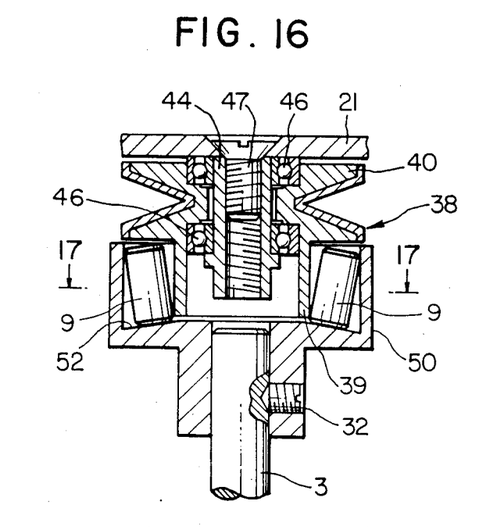
FIG. 16 is a sectional view of the third embodiment of the bidirectional clutch of the present invention.
Figure 17:
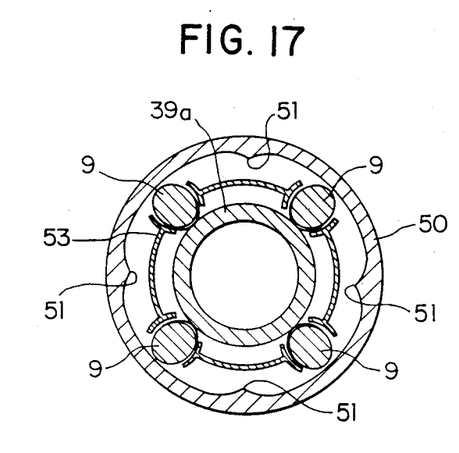
FIG. 17 is a sectional view taken along the line 16—16 of FIG. 16.

A third embodiment of the present invention will now be explained with reference to FIGS. 16 and 17.

According to this embodiment, a rotary cam 50 is disposed around the outside of the drum portion 39a. To this end, the rotary cam 50 is substantially cylindrical in cross-section. On the inner periphery of the cam 50, there are provided projections 51 equal in number to the number of rollers 9 at equiangular intervals, and both surfaces of the projections 51 are made contiguous to each other in an arched form to define a cam face. Further, the rotary cam 50 is provided at its bottom face with outwardly and downwardly inclined support faces 52 for supporting the rollers 9 so that the upper ends are outwardly inclined to bring the outward ends of the rollers 9 into contact with the cam face, in contrast to the first embodiment. Reference numeral 53 designates a guide wheel for supporting the rollers 9 in a movable manner for movement from the tilted position radially inwardly to an upright position.

The remainder of the structure is similar to that of the preceding embodiments. Effects similar to those obtained in the preceding embodiments are attainable with such a construction.

It is understood that while the foregoing embodiments have been described as using the balls and rollers as the rotary bodies, the present invention is not limited thereto. Other forms of rotary bodies, such as barrel type rollers, may be used.

It is also understood that while the first and second embodiments have been described with reference to the rotary cams 4 and 34 having a tetragonal form, the present invention is not limited thereto. Polygonal rotary cams such as triangular or pentagonal rotary cams may be used.

EFFECT OF THE INVENTION

As described above, the present invention comprises in combination a rotary cam connected to a drive shaft of a motor, a rotatable pulley body having a drum portion arranged coaxially therewith, a guide member interposed between the rotary cam and drum portion and rotary bodies rotatably held in radial holes in the guide member. Thus the present invention provides a bidirectional clutch which can transmit the rotational force of the motor to the pulley body by tilting or moving of the rotary bodies into pressing engagement with the drum portion during the forward or reverse rotations of the motor, which clutch has a simple structure and insures connection or disengagement upon starting or stopping of the motor, and which can be manufactured at a relatively low cost.

The present invention offers another advantage in the provision of a bidirectional clutch for a curtain drawing mechanism which avoids the motor rotation resistance on the pulley even when an electrical system for the motor malfunctions, whereby the curtain can be easily drawn or opened by manual operation of a drawing string, since the clutch mechanism is disconnected whenever the motor is not actuated.

What is claimed is:

1. A bidirectional clutch for a pulley drive, comprising:
    a rotary cam adapted to be mounted on an upright drive shaft of a motor;
    a pulley body having a drum portion having a face coaxial with the rotary axis of said rotary cam and spaced from said rotary cam;
    a plurality of elongated rotatable bodies positioned in a space between said drum portion and said rotary cam; and
    a guide member for rotatably supporting said elongated rotatable bodies in said guide member for normally being tilted in a position in which said rotatable bodies are out of engagement with said drum portion and being movable to a position where said rotatable bodies tightly engage with said drum portion, a face of said rotary cam being opposed to said drum portion having a cam portion which, upon said cam being rotated relative to said rotatable bodies and said drum portion, moves said rotatable bodies toward and presses them into engagement with said drum portion to transmit the rotational force of the motor to said drum portion and said pulley body.

2. A bidirectional clutch as claimed in claim 1 in which said rotary cam is inside said drum portion.

3. A bidirectional clutch as claimed in claim 1 in which said rotary cam is outside said drum portion.

4. A curtain drawing and opening mechanism comprising:
    a driving motor having an upright driving shaft;
    a rotary cam mounted on said upright drive shaft;
    a pulley body having a drum portion having a face coaxial with the rotary axis of said rotary cam and spaced from said rotary cam;
    a plurality of elongated rotatable bodies positioned in a space between said drum portion and said rotary cam; and
    a guide member for rotatably supporting said elongated rotatable bodies in said guide member for normally being tilted in a position in which said rotatable bodies are out of engagement with said drum portion and being movable to a position where said rotatable bodies tightly engage with said drum portion, a face of said rotary cam being opposed to said drum portion having a cam portion which, upon said cam being rotated relative to said rotatable bodies and said drum portion, moves said rotatable bodies toward and presses them into engagement with said drum portion to transmit the rotational force of the motor to said drum portion and said pulley body; and
    means engaged with said pulley body for connection to a curtain for drawing and opening the curtain in response to rotational of said pulley body.

* * * * *